United States Patent [19]

Backman

[11] Patent Number: 4,927,547

[45] Date of Patent: May 22, 1990

[54] METHOD OF FILTERING THE EFFLUENT FROM A WIRE EDM PROCESS

[76] Inventor: Sune Backman, Götavägen 10B, Djursholm S-182 61, Sweden

[21] Appl. No.: 262,775

[22] Filed: Oct. 26, 1988

[51] Int. Cl.$^5$ .............................................. B01D 23/24
[52] U.S. Cl. ........................................ 210/771; 134/10; 134/34; 134/37; 210/791; 210/798
[58] Field of Search ............... 210/492, 488, 410, 411, 210/506, 510.1, 771, 780, 797, 798, 808, 108, 791, 412; 204/129.5, 129.6; 219/69 M; 134/10, 34, 37

[56] References Cited

U.S. PATENT DOCUMENTS

| | | | |
|---|---|---|---|
| 2,327,648 | 8/1943 | Kasten | 210/488 |
| 2,568,144 | 9/1951 | Cremer et al. | 154/101 |
| 2,654,440 | 10/1953 | Robinson | 183/44 |
| 3,294,582 | 12/1966 | Suchy | 177/155 |
| 4,092,247 | 5/1978 | Madsen | 210/67 |
| 4,161,422 | 7/1979 | Lawson et al. | 162/135 |
| 4,279,748 | 7/1981 | Inoue | 210/510.1 |
| 4,358,383 | 11/1982 | Asp | 210/771 |
| 4,404,106 | 9/1983 | Muller et al. | 210/797 |
| 4,472,229 | 9/1984 | Martin | 156/307.1 |
| 4,491,714 | 1/1985 | Inoue | 219/69 M |
| 4,500,435 | 2/1985 | Muller | 210/798 |
| 4,649,255 | 3/1987 | Inoue | 204/129.5 |
| 4,664,814 | 5/1987 | Backman et al. | 210/780 |
| 4,710,402 | 12/1987 | Backman et al. | 210/506 |
| 4,740,315 | 4/1988 | Backman | 210/798 |
| 4,784,169 | 11/1988 | Striedieck | 210/108 |
| 4,810,380 | 3/1989 | Backman et al. | 210/488 |

FOREIGN PATENT DOCUMENTS

| | | | |
|---|---|---|---|
| 0026270 | 4/1981 | Fed. Rep. of Germany | 210/411 |
| 3409036 | 8/1985 | Fed. Rep. of Germany | 210/798 |
| 49-85816 | 7/1974 | Japan | 156/299 |
| 8202003 | 6/1982 | PCT Int'l Appl. | 210/798 |
| 0738637 | 6/1980 | U.S.S.R. | 210/780 |
| 226274 | 12/1924 | United Kingdom | 210/488 |
| 1000263 | 8/1965 | United Kingdom | 210/488 |

*Primary Examiner*—Frank Spear
*Assistant Examiner*—Joseph Drodge
*Attorney, Agent, or Firm*—Seidel, Gonda, Lavorgna & Monaco

[57] ABSTRACT

The present invention is directed to a method of removing impurities from the effluent of an EDM process wherein the improvement comprises steps of: providing a filter apparatus; providing the effluent from an EDM process to said apparatus; filtering impurities from the effluent thereby forming a filtrate; removing said apparatus from said effluent; and back flushing said apparatus with said filtrate, said back flushing conducted at a pressure greater than atmospheric pressure, thereby removing the impurities from said apparatus.

16 Claims, 2 Drawing Sheets

METHOD OF FILTERING THE EFFLUENT FROM A WIRE EDM PROCESS

SCOPE OF THE INVENTION

The instant invention is directed to a method for filtering the effluent from a wire EDM (Electrical Discharge Machining) process. Specifically, it has been found that the impurities collected on the filter elements can be effectively and quickly removed by back flushing the filter elements, at an elevated pressure, with the cleaned filtrate or cleaned filtrate and compressed air.

BACKGROUND OF THE INVENTION

In EDM processing, a potential difference, i.e. voltage, is applied between a moving wire and the material being machined. The voltage is increased to an amount sufficient to overcome the dielectric breakdown strength of the medium, e.g. deionized water or other dielectric fluid, which separates the wire and the material. When the voltage overcomes the dielectric strength of the medium, a spark is generated, and current flows from the wire to the material or vise versa, depending upon the polarity. Two things result from the current flow. First, the current ionizes the medium between the wire and the material being machined at the point at which the electric field intensity is a maximum and creates a cylindrical envelope of ionized gas, thereby electrically coupling the wire to the material. Second the gas expands in the medium because of the associated elevated temperature and then collapses, much as a cavitation bubble would collapse. The electric energy in the spark, therefore, initially heats to a melting temperature, a very small spot on the surface of the material being machined, and this molten material is then rapidly ejected by the collapsing force of the ionized gas bubble.

Perhaps this is a somewhat different method of defining the mechanics of electric discharge machining. One can imagine, for example, that if an electric current can be developed through an ionized gas, as occurs in tungsten inert gas welding, then virtually all the current supplied is utilized to heat and melt the material away or contribute to bonding, such as in welding. In this case, the material tends to remain at its original site, although it may become molten. In order to remove such material it is necessary to use other mechanical means.

In the case of electric discharge machining, the action of the expanding gas and subsequent collapse of the gas bubble provides the mechanical means for ejecting this micro (very small) puddle of molten metal at the site of the spark initiation.

By-products of the process comprise numerous impurities which may include, among other things, fine particles of the material machined, and metal hydroxides or metal hydroxide salts formed when the medium is ionized. The exact composition of these impurities is not known with certainty. Somethings are, however, known. The principle one of which is that much of the debris is conductive, so that its random distribution in the medium, in effect, alters the distance between the wire and the material being cut, thus reducing the voltage at which dielectric breakdown will occur and thereby limiting the amount of energy that can be carried by the spark. Thus, the impurities effect the dielectric strength of the medium. These impurities, which build up with time during operation, reduce the medium's effectiveness as a dielectric. Thus, it is necessary to filter out these impurities so that the EDM process can be effectively controlled.

In U.S. Pat. No. 4,740,315, a filtering system for an EDM process is disclosed. Therein, an edge filter is utilized to remove the impurities from the EDM process effluent. The impurity coated filter elements, however, are cleaned by air drying the impurities to a powder. At the time that method was proposed, it was not believed that water back flushing would cleanse the filter elements of the impurities because of the tenacity with which the impurities (in sludge form) adhere to the filter elements. This air dry cleansing method is not only time consuming, but it is expensive because the air blown across the elements is typically heated. U.S. Pat. No. 4,740,315 is incorporated herein by reference.

SUMMARY OF THE INVENTION

The present invention is directed to a method of removing impurities from the effluent of an EDM process wherein the improvement comprises the steps of:

providing a filter apparatus;

providing the effluent from an EDM process to said apparatus;

filtering impurities from the effluent thereby forming a filtrate;

removing said apparatus from said effluent; and back flushing said apparatus with said filtrate, said back flushing conducted at a pressure greater than atmospheric pressure, thereby removing the impurities from said apparatus.

This method is an improvement over the method set forth in U.S. Pat. No. 4,740,315. The instant method is quicker in operation: back flush cleansing time can be reduce to about 1 to 12 seconds. The instant invention is less expensive to operate: the necessity for heated air is eliminated. The instant method is simpler to operate: the air blowing apparatus is eliminated and the dual filter arrangement is reduced to a single filter.

DESCRIPTION OF THE DRAWING

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
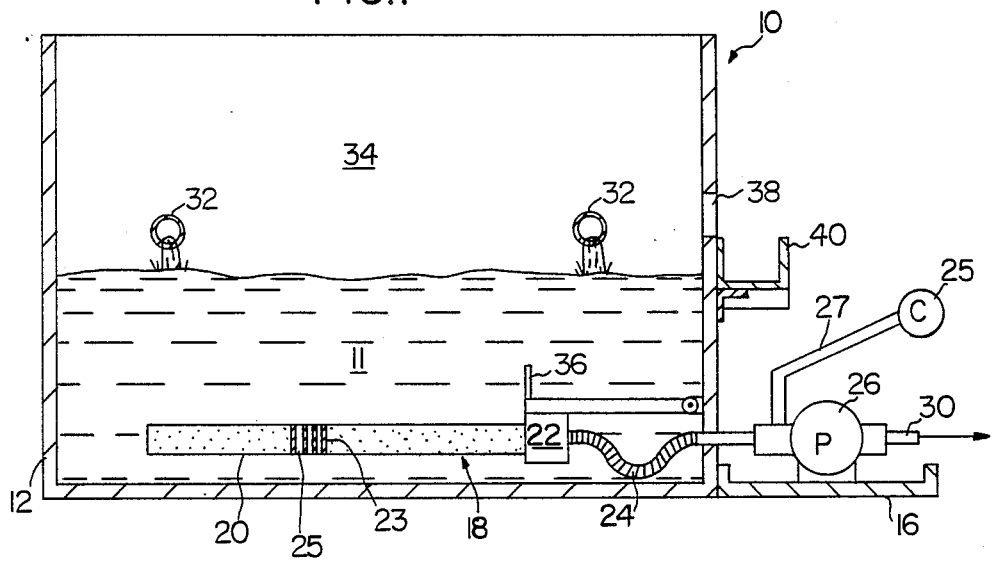
FIG. 1 is an elevational view of the present invention in which the filter elements are immersed in the effluent.

Referring to the drawings wherein like numerals indicate like elements, there is shown in FIG. 1 a filter apparatus 10 made according to the instant invention.

Figure 2:
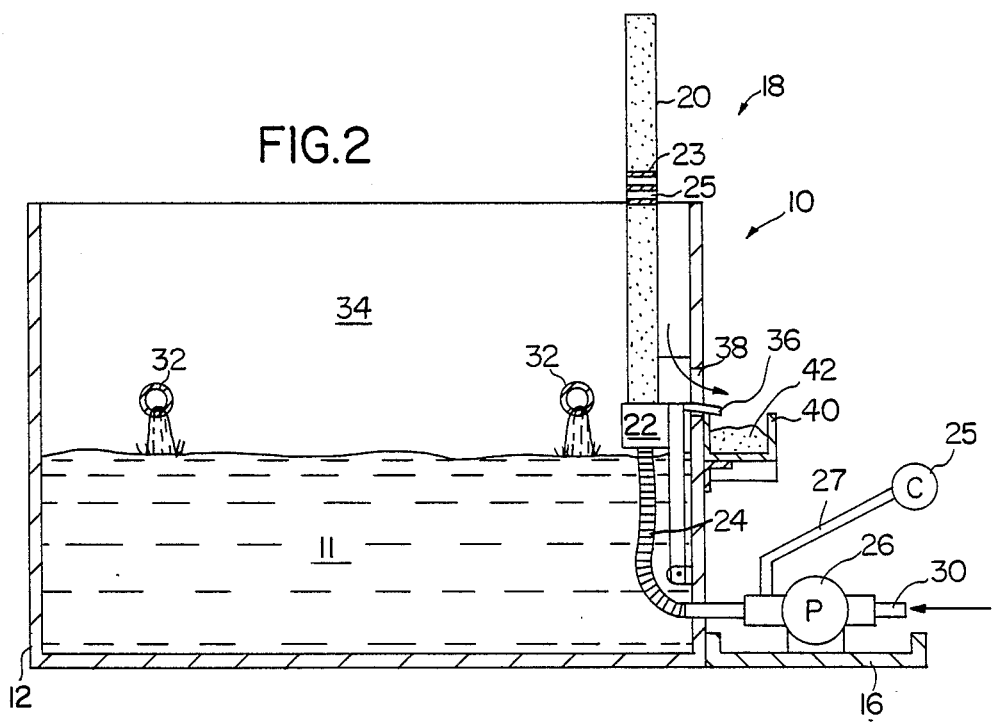
FIG. 2 is an elevational view of the present invention in which the filter elements are elevated out of the effluent.
Figure 3:
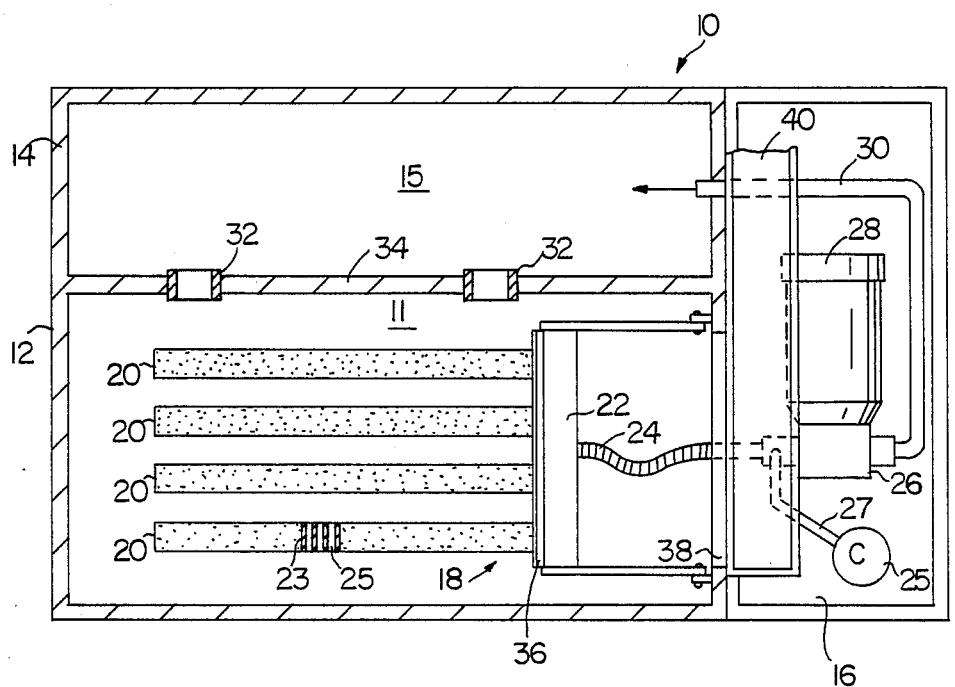
FIG. 3 is a top plan view of the apparatus shown in FIG. 1.

Effluent 11 from a wire EDM process is introduced into effluent chamber 12 of filter apparatus 10. Edge filter apparatus 18 is immersed in effluent 11. Edge filter apparatus 18 comprises of plurality of filter sticks 20 connected to a manifold 22. Individual filter sticks 20 may comprise a plurality of annular filter disks 23, see U.S. Pat. No. 4,710,402 incorporated herein by reference, stacked upon one another about a tube (not shown) through which the filtrate may pass to the manifold. See U.S. Pat. No. 4,664,814, which is incorporated herein by reference, for a non-limiting example of the apparatus which holds the disks 23 on the tube. Apparatus 18 is pivotal between the immersed position shown in FIG. 1 and an elevated position shown in FIG. 2.

Manifold 22 is connected to a pump 26 via line 24. Pump 26 is impeller pump. Such pumps are well known to those of ordinary skill in the art. Pump 26 is driven by a reversible electric motor 28. Pump 26 and motor 28 are preferably contained within a pump chamber 16.

A source of compressed air 25 is in communication with line 24 via line 27 which may have an inside diameter of 8 mm. The compressed air, at a pressure of about 7 bars, may be combined with the filtrate during back flushing. The combination of compressed air and filtrate provide the necessary back flushing pressure and flow-through velocity to obtain effective filter cleaning.

A filtrate chamber 14 which receives filtrate 15 is preferably located adjacent to effluent chamber 12. Filtrate chamber 14 is connected to pump 26 via conduit 30.

Wall 34 which separates effluent chamber 12 and filtrate chamber 14 may include a plurality of overflow holes 32 which allow filtrate to spill over into effluent chamber 12. Filtrate is generated faster than effluent.

At the base of manifold 22 is a lip 36. When filter apparatus 18 is in its elevated position (see FIG. 2), lip 36 protrudes through a port 38 in a side wall of apparatus 10. During the back flushing, the impurities or sludge 42 formed on the filter sticks cascades off the filter sticks 20 to lip 36 and into a sludge box 40.

In operation, effluent from the EDM process is charged into chamber 12 and filter apparatus 18 is immersed in the effluent 11. See FIG. 1. Pump 26 draws the effluent to the filter sticks 20 and removal of the impurities occurs at the outside of the plurality of disks and in the interstices 25 between filter disks 23. Note U.S. Pat. No. 4,810,380 is incorporated hereby by reference. Filtrate 15 is drawn into the manifold 22 and through the pump 26, then discharged into chamber 14. After a period of time during which impurities are built up on the filter disks 23, filter sticks 20 are raised out, any conventional method may be used, of the effluent. See FIG. 2. Pump 26 is then reversed so as to draw filtrate from chamber 14. The back flushed filtrate is pumped into the filter sticks 20 at a pressure of approximately 2.5 bar. The cleaning action takes place in approximately 10 seconds although times between one second and twelve seconds are also contemplated. Alternatively, the combination of filtrate at about 2.5 bar and compressed air at about 7 bar are introduced into manifold 22 from line 24. This also performs a good back flush cleaning of sludge from the filter disks. It is also within the scope of the back flushing scheme to pulse the back flush of filtrate alone or in combination with the compressed air to the filter disks.

The present invention may be embodied in other specific forms without departing from the spirit or essential attributes thereof and, accordingly, reference should be made to the appended claims, rather than to the foregoing specifications, as indicating the scope of the invention.

I claim:

1. A method for removing impurities from a liquid-solid effluent generated in an electric discharge machining process, said method comprising the steps of:

(a) providing at least one filter apparatus, comprising at least one filtering means for separating at least a portion of said impurities from said effluent, said filter apparatus being oriented in an operating position wherein said filtering means is at least partially immersed in said effluent, and said filter apparatus being mounted for movement between said operating position and a cleaning position in which said filtering means is not immersed in said effluent;

(b) providing said effluent from said electric discharge machining process to said filter apparatus;

(c) filtering at least a portion of said impurities from said effluent by drawing at least a portion of said effluent, in a filtering direction, through said filtering means, thereby forming a liquid filtrate;

(d) moving said filter apparatus to said cleaning position; and (e) backflushing a medium, comprising said liquid filtrate, through said filtering means in a cleaning direction which is opposite to said filtering direction, said backflushing being conducted at an elevated pressure greater than atmospheric pressure, thereby removing at least a portion of the impurities from said filtering means.

2. In the method according to claim 1 wherein said elevated pressure is about 2.5 bar.

3. In the method according to claim 1 said filter apparatus is an edge filter.

4. In the method according to claim 1 wherein said backflushing occurs for at least one second.

5. In the method according to claim 4 wherein said backflushing occurs for between about 1 to about 12 seconds.

6. A method according to claim 1 wherein said medium for backflushing further comprises compressed air.

7. In the method according to claim 6 wherein said compressed air is at a pressure of about 7 bars.

8. In the method according to claim 6 further comprising the step of pulsing said filtrate and said compressed air during said backflushing.

9. A method according to claim 1 wherein said filtering means comprises at least one filtering element.

10. A method according to claim 9 wherein said at least one filtering element comprises a plurality of annular filter discs generally perpendicular to the longitudinal axis of said at least one filtering element.

11. A method according to claim 9 wherein said filter apparatus further comprises a manifold located at the base of said at least one filtering element.

12. A method in accordance with claim 1 further comprising the step of providing a means for discharging said portion of said filtered impurities removed from said filtering means during said backflushing step.

13. A method in accordance with claim 12 wherein said discharging means comprises a protruding ledge located at the lower portion of said filtering means for channeling at least a portion of said removed filtered impurities to a collecting area.

14. A method in accordance with claim 13 wherein said collecting area comprises a sludge box.

15. A method in accordance with claim 13 wherein said collecting area comprises a movable belt.

16. A method in accordance with claim 12 wherein at least a portion of said removed filtered impurities is deposited onto a movable filter paper means.

* * * * *